United States Patent [19]
Hattori

[11] Patent Number: 4,854,926
[45] Date of Patent: Aug. 8, 1989

[54] POWER TRANSMITTING V-BELT
[75] Inventor: Torao Hattori, Saitama, Japan
[73] Assignee: Honda Giken Kogyo Kabushiki Kaisha, Tokyo, Japan
[21] Appl. No.: 203,001
[22] Filed: Jun. 6, 1988
[30] Foreign Application Priority Data Jun. 5, 1987 [JP] Japan .............................. 62-86771[U]

[51] Int. Cl.$^4$ ............................................... F16G 1/22
[52] U.S. Cl. ...................................... 474/242; 474/201
[58] Field of Search ................. 474/201, 237, 240–246

[56] References Cited
U.S. PATENT DOCUMENTS 4,552,548 11/1985 Hattori .................................. 474/201
4,698,050 10/1987 Hattori et al. ....................... 474/242
4,741,727  5/1988 Hattori et al. ................... 474/242 X
4,758,211  7/1988 Hattori et al. ................... 474/201 X Primary Examiner—Thuy M. Bui
Attorney, Agent, or Firm—Lyon & Lyon

[57] ABSTRACT

In a power transmitting V-belt comprising an endless metal band mounted on a multiplicity of V-shaped metal blocks linked so that a semi-cylindrical recess provided on one metal block of each adjacent pair of V-shaped metal blocks is engaged by a semi cylindrical projection, such as a roller, associated with the other metal block of the adjacent pair to pivotally link the adjacent blocks. A relief portion having a suitable length is provided at an axially central portion of the recess to be recessed more deeply than the remainder of the recess. This allows uniform contact and satisfactory lubrication between the projection and the recess without interference from the central portion.

5 Claims, 3 Drawing Sheets

POWER TRANSMITTING V-BELT

The present invention relates to a power transmitting V-belt and, more particularly, to a power transmitting V-belt for use in combination with a variable diameter V-pulley.

There are various conventional power-transmitting V-belts for use in V-belt type continuously variable transmissions for vehicles that employ variable diameter V-pulleys. Such V-belts normally are comprised of a metal band which is formed of a plurality of endless laminated metal band elements and which are restrained and held by a large number of V-shaped metal blocks provided adjacent one another. FIG. 6 illustrates a perspective view of a V-shaped metal block in a V-belt of this type disclosed in Japanese Utility Model Application Laid-Open No. 79038/85 assigned to the assignee of this application.

The prior art V-shaped metal block 4' shown in FIG. 6 has a recessed groove 5' that is open upwardly with a bottom surface of the recessed groove 5' being formed as a support surface 5a bearing against a lower surface of a metal band B', shown by one-dash chain line, to support the band. The metal block 4' is also provided, at its opposite side surfaces, as viewed in a lengthwise direction of the metal band B', with widthwise extending semi-cylindrical recesses 8'. A roller member is interposed between the opposed recesses 8' of the adjacent metal blocks to provide an assembled V-belt. Alternatively, without interposition of such roller members, one of the two recesses 8' on the metal block 4' may be replaced by a semi-cylindrical projection which is directly engaged in the semi-cylindrical recess of the adjacent metal block.

In addition, the V-shaped metal block 4' has a pair of inclined portions 4a', 4a' formed at its opposite ends, as viewed in the widthwise direction of the band B' that are adapted to engage a V-groove of a V-pulley which is not shown. The block 4' has an upper wall 4b', a transverse groove 9a' extending in a lengthwise direction of the band, and a vertical groove 9b' extending in the direction of the thickness of the band for receiving a wire stopper member 6', indicated one-dash chain line, which is locked at its opposite ends, so that the metal band B' placed on the support surface 5a' is restrained and held on the support surface 5a' by the stopper member 6'. The transverse and vertical grooves 9a' and 9b' form a curved slot 9' for locking the stopper member.

The above construction provides an advantage that the height of the upper wall 4b', i.e., the entire height of the metal block itself, can be reduced but the following problems still remain unsolved. More specifically, in producing the metal bock of such a complicated shape, for example from a sintered alloy, the semi-cylindrical recesses 8' located on the front and rear opposite side surfaces are shaped using complementary convex dies and hence the central portion of each of the recesses 8' of the metal block 4' tends to have a high density of material. For this reason, a phenomenon of expansion of the central portion may be produced in the course of sintering and thermal treatment steps. In such a case, when the roller member is interposed between the respective proposed recesses 8' of the two adjacent V-shaped metal blocks, the roller member bears only against the central portions of the recesses 8' and is not in uniform contact with the recessed over the entire axial region thereof.

In addition, since the roller member is relatively long, it is difficult to obtain uniform lubrication of the roller member along its entire length.

Even with the metal block in which the roller member is omitted and one of the recesses is replaced by the semi-cylindrical projection, the above problems have a similar tendency to occur with respect to the other recess.

It is an object of the present invention to provide a power transmitting V-belt in which a uniform contact is achieved in the recesses of the adjacent V-shaped metal blocks and the lubricating condition is improved.

According to the present invention, a relief portion having a suitable length is concavely formed at an axially central portion of each of semi-cylindrical recesses defined on each of metal blocks of a V-belt and is recessed more deeply than the remainder of the recesses. By this construction, a V-belt is provided wherein uneven contact and seizure are prevented in the recesses of each of the V-shaped metal blocks and the general power transmitting function is further improved.

The above and other objects, features and advantages of the invention will become apparent from reading of the following detailed description of the preferred embodiment, taken in conjunction with the accompanying drawings.

DESCRIPTION OF THE PREFERRED EMBODIMENT

A preferred embodiment of the present invention will now be described with reference to FIGS. 1 to 5.

Figure 1:
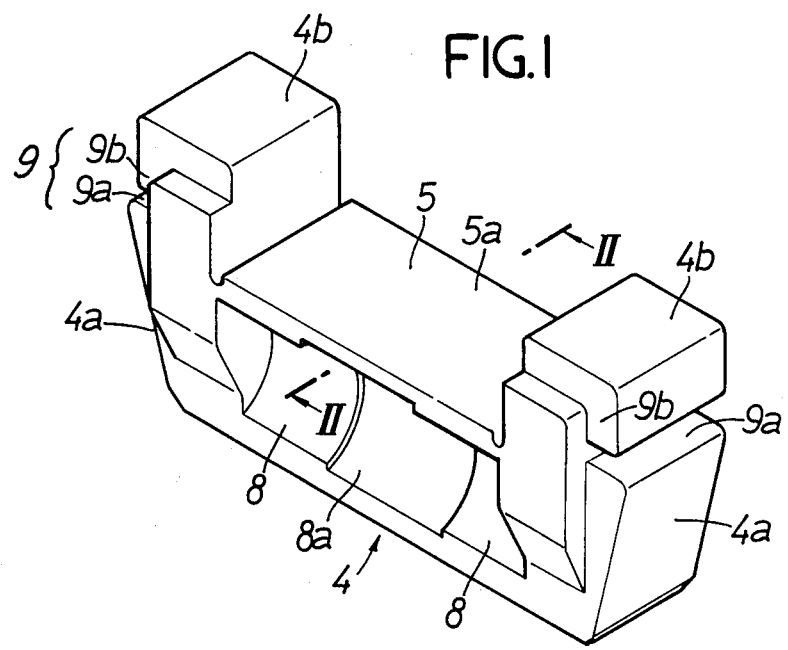
FIG. 1 is an enlarged perspective view of a preferred embodiment of a V-shaped metal block for forming a power transmitting V-belt according to the present invention.
Figure 2:
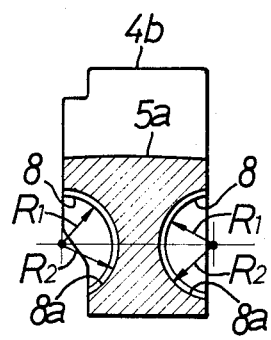
FIG. 2 is a sectional view taken along a line II—II in FIG. 1.
Figure 3:
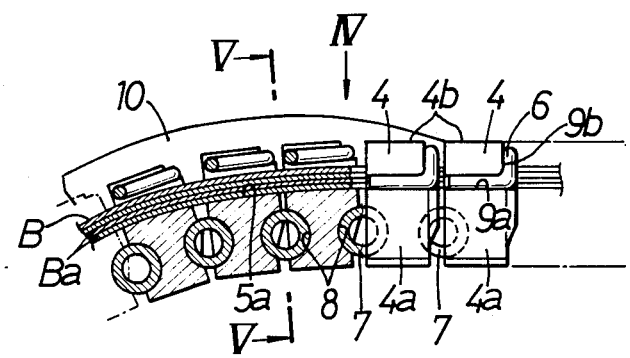
FIG. 3 is a partially sectioned side view of the V-belt of this embodiment.
Figure 4:
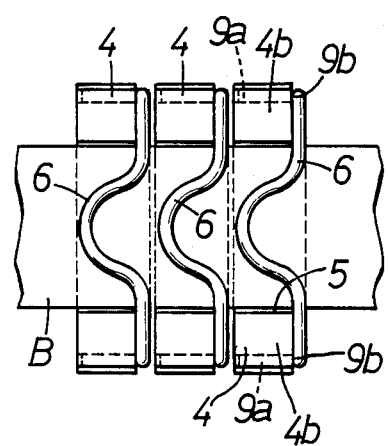
FIG. 4 is a plan view of a portion of FIG. 3 as viewed in the direction of arrow IV in FIG. 3.
Figure 5:
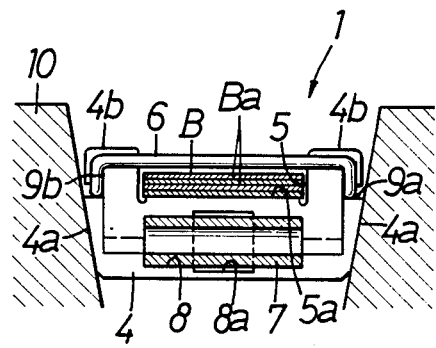
FIG. 5 is a sectional view taken along a line V—V in FIG. 3.

As shown in FIGS. 3 to 5, a metal band B is comprised of a plurality of endless laminated metal band elements Ba and has a bottom surface bearing on a support surface 5a which forms a bottom surface of an upwardly opened recessed groove 5 for receiving the metal band B in each of a large number of V-shaped metal blocks 4. A wire stopper member 6 is locked at its opposite ends in a transverse groove 9a and a vertical groove 9b of a locking slot 9 to restrain and hold the metal band B. A roller member 7 is interposed between opposed semi-cylindrical recesses 8 provided on the opposite side surfaces, as viewed in the lengthwise direction of the band B, of adjacent V-shaped metal blocks 4. The roller member 7 may be cylindrical or at least provided with a pair of oppositely facing semi-cylindrical projections engaging the semi-cylindrical recesses. A V-belt 1 of this embodiment is comprised of the metal band B, a large number of the V-shaped metal blocks 4, a large number of the roller members 7 and a large number of the stopper members 6.

Figure 6:
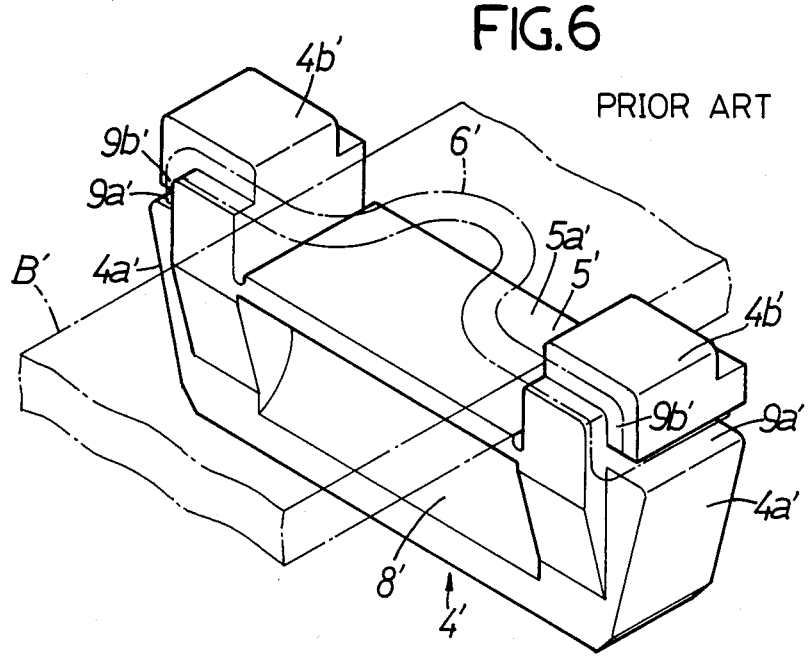
FIG. 6 shows one example of the prior art V-shaped metal block.

The V-shaped metal block 4 according to this embodiment of the present invention is similar in basic structure to the prior art V-shaped metal block shown in FIG. 6 and has the recessed groove 5 between the opposite upper walls 4b, 4b thereof and a pair of inclined portions 4a, 4a formed at its opposite side surfaces, as viewed in the widthwise direction of the band B adapted to engage a V-groove of a V-pulley 10.

Unlike the prior art shown in FIG. 6, however, a semi-cylindrical recess or relief portion 8a having a certain axial width is provided at an axially central portion of each of the semi-cylindrical recesses 8 of each of the V-shaped metal blocks 4. The relief portion has a radius R2 slightly larger than the radius R1 of the recess 8 (see FIGS. 1 and 2). Therefore, the relief portion 8a is formed on the metal block 4 to be recessed more deeply than the recess 8.

In the operation of this embodiment of the invention, the provision of the suitable relief portion 8a at the central portion of each of the pair of recesses 8 in the V-shaped metal block 4 makes it possible to compensate for any expansion of the metal at the central portion during sintering and thermal treatment due to the densification of the material when such metal block 4 is formed, for example, from a sintered alloy using complemental convex dies. Moreover, it is possible to prevent the generation of high surface pressure at the central portion due to an uneven contact with the roller member 7 and seizure due to failure of lubrication during use of the V-belt.

This construction permits the use of, for example, an iron-based sintered alloy as a material for such a block of a complicated shape which avoids the costly conventional machining otherwise required. In addition, the use of a sintered product previously impregnated with a lubricant in a so-called oilless (oil impregnated) bearing manner utilizing a porous structure, which is a characteristic thereof, can considerably improve the lubricity to reduce the frictional force and further contribute to prevention of a seizure or the like.

The above effects can be likewise obtained not only with a V-belt of a type in which the roller member 7 is locked in the respective opposed recesses 8, 8 of adjacent metal blocks 4 as shown in the drawings, but also with a V-belt of a type in which one of the recesses is replaced by a projection, with the recess of one metal block being engaged by the projection of the adjacent metal block whereby the roller member is omitted.

What is claimed:

1. A power transmitting V-belt comprising an endless metal band mounted on a multiplicity of V-shaped metal blocks lined to one another, with a semi-cylindrical recess extending in a widthwise direction of said metal band being provided on one V-shaped metal block and engaged by semi-cylindrical projection associated with an adjacent metal block to provide a pivotable linkage between said adjacent V-shaped metal blocks, wherein a relief portion having a predetermined axial length is provided at an axially central portion of the said semi-cylindrical recess and projection for eliminating or minimizing the engagement therebetween at said central portion.

2. A power transmitting V-belt according to claim 1, wherein each said V-shaped metal block has a said semi-cylindrical recess provided on each opposite side surface as viewed in the lengthwise direction of said metal band and a roller member is interposed between the two adjacent V-shaped metal blocks to be engaged in the respective opposed semi-cylindrical recesses of said adjacent metal blocks.

3. A power transmitting V-belt according to claim 2, wherein each said roller member is cylindrical.

4. A power transmitting V-belt according to claims 1, 2 or 3, wherein said relief portion is formed into a semi-cylindrical shape having a radius larger than a radius of said semi-cylindrical recess.

5. A power transmitting V-belt according to claims 1, 2 or 3, wherein said V-shaped metal block is formed from a sintered alloy.

* * * * *